Jan. 7, 1969    Q. M. LOCKREM    3,420,108
WHEEL BALANCER
Filed Sept. 23, 1965
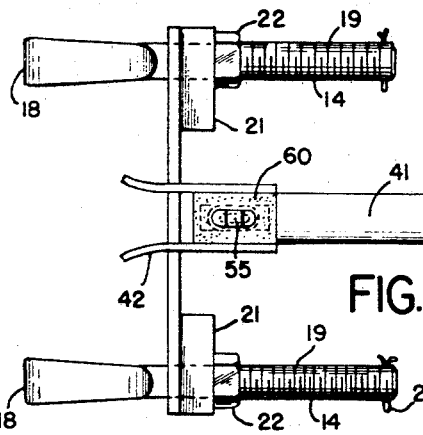
FIG. 2
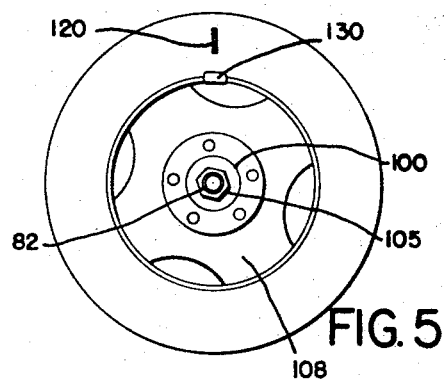
FIG. 5
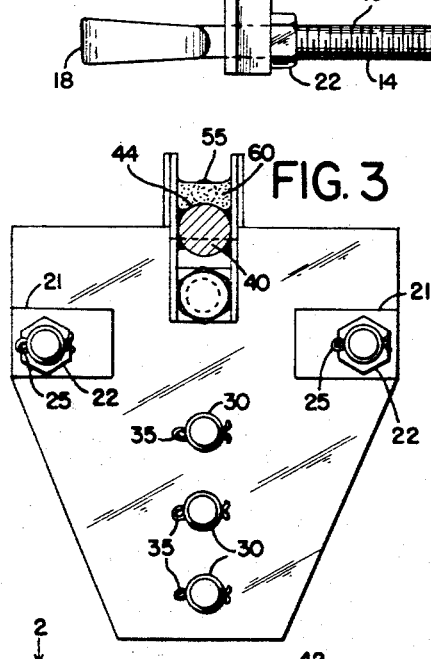
FIG. 3
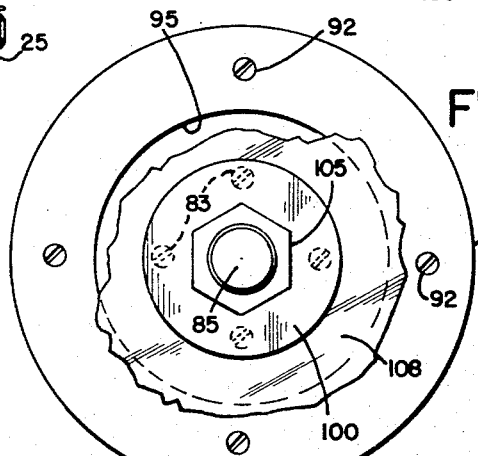
FIG. 4
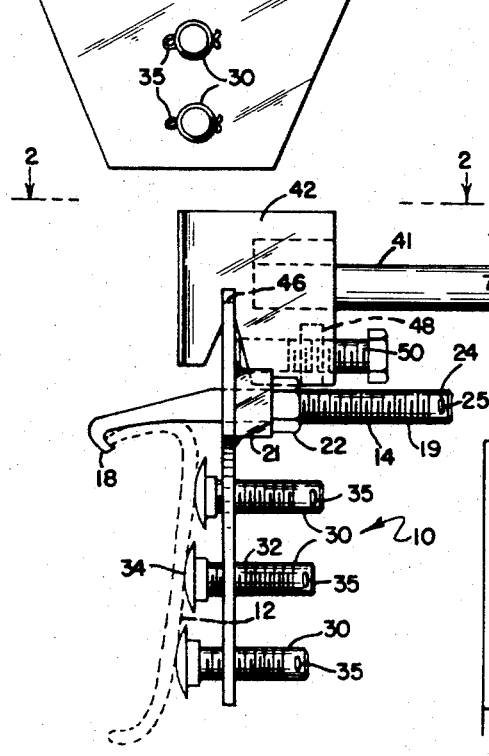
FIG. 1
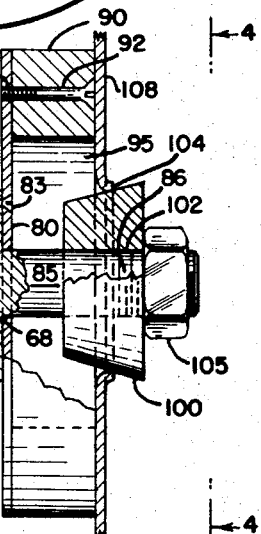
INVENTOR.
Q. MATTHEW LOCKREM
BY
Schroeder, Siegfried & Ryan
ATTORNEYS United States Patent Office 3,420,108
Patented Jan. 7, 1969

3,420,108
WHEEL BALANCER
Quentin Matthew Lockrem, Box 484,
Yankton, S. Dak. 57078
Filed Sept. 23, 1965, Ser. No. 489,514
U.S. Cl. 73—480
Int. Cl. G01m 1/14
9 Claims

ABSTRACT OF THE DISCLOSURE

A wheel balancing apparatus of the portable type designed to be mounted on a bumper of a vehicle and adjustably positioned thereon to provide a horizontal reference and a vertical mounting for the wheel to be balanced so that unbalance in the wheel or tire thereon will be evident by rotation of the wheel under the influence of gravity.

My invention relates to wheel balancing apparatus and more particularly to an improved portable wheel balance sensor.

In apparatus of this type, the primary purpose is to provide a means for supporting a wheel of the motor vehicle so that it may be freely rotatable in a plane so that any variations from a true balance in the wheel may be detected through the effect of gravity. It frequently happens that one side of the wheel is heavier than the other and these conditions lead to inefficient operation and excessive wear on the tire. Various types of balance sensing structures have been previously used so that such conditions may be sensed and corrected. While such balance sensing may take place under both static and dynamic conditions, the most prevalent type is that of static balance sensing. However, all such equipment are extremely large, floor mounted, expensive, complex and require trained personnel to satisfactorily use the same. They are neither accurate enough nor sensitive enough for the high speeds we travel today. Such sensing equipment has large bearings which cause undesirable drag making the sensing device insensitive to small variations of unbalance in the wheel making it almost impossible to get a truly accurate balance. Moreover, such sensing equipment is usually susceptible to dirt in the exposed bearings or requires numerous bearing shields causing frictions which add inaccuracies in the wheel balancing operation.

The idea and purpose of the present invention is to provide a portable type wheel balance sensor which makes it possible for a vehicle owner or operator to balance the wheels on his vehicle whenever and wherever it is necessary and convenient.

This improved portable unit is small enough to be carried around in a trunk of a vehicle similar to any other piece of maintenance equipment, such as a jack, so that it is readily accessible and available to the vehicle operator. Further it is a simplified low cost device readily available to vehicle operators in general such that they may balance the wheels on their own vehicle to improve the safety and performance of the vehicle and reduce cost of tire wear. This improved portable wheel balance sensor is very simply mounted on the bumper of the vehicle and adjusted to suspend a vehicle wheel to be balanced in a vertical plane. The improved balancer is substantially frictionless such that it will accurately detect unbalance in a wheel so that proper weights may be applied thereto in the correct position to bring the wheel back into balance and improve the operation of the same. Further the improved wheel balancer has its bearing parts enclosed so that they are not susceptible to wear or other damage to alter the accuracy of the same.

Therefore it is an object of this invention to provide an improved and simplified wheel balance sensor.

Another object of this invention is to provide a portable wheel balance sensor which is extremely accurate and easy to use.

A further object of this invention is to provide a wheel balance sensor which may be readily carried around in a vehicle so as to be avialable to use at all times.

A still further object of this invention is to provide a wheel balancer sensor of this general type which is simple in design, low in cost, easy to use, which will provide accurate balance sensing and is readily available for all vehicle owners.

These and other objects of this invention will become apparent from a reading of the attached description together with the drawings wherein:

FIGURE 1 is a side elevation view of the improved portable wheel balance sensor with parts in section;

FIGURE 2 is a top view of the improved portable wheel balance sensor with parts broken away;

FIGURE 3 is a sectional view of the improved portable wheel balance sensor of FIGURE 1 taken along the lines 3—3 therein;

FIGURE 4 is a sectional view of the improved wheel balance sensor of FIGURE 1 taken along the lines 4—4 therein; and FIGURE 5 is an end elevation view, reduced in size, showing a wheel mounted on the improved portable wheel balance sensor.

My improved portable wheel balance sensor is basically formed of two parts. Thus as will be seen in FIGURE 1, the improved wheel balance sensor includes a base or plate portion 10 and a wheel support structure, indicated generally at 20, which is adapted to be mounted on the base. In FIGURE 1, a bumper is indicated in phantom at 12 such as is normally found on an automobile and to which the base or plate 10 is adapted to be connected and mounted. Plate 10 has a pair of spaced hooks or flange members which are positioned through apertures in the upper edges of the plate with the hooks or flange members extending transversely to the extent of the plate. The hooks 14 have turned over extremities 18 and a threaded shank portion 19. The hooks extend through the apertures in the base plate which apertures have supporting collar portions 21 adjacent the same with similar sized apertures therethrough. A tightening nut 22 is positioned on each of the threaded shank portions of the hooks and a suitable aperture 24 in this extremity of the hook members permits location of a suitable cotter-key 25 therein to retain the nut on the threaded shank portion.

Plate 10 is mounted on a plunger bumper by adjusting the hook end of the flange member or hooks through the plate a sufficient extent to fit around the upper edge surface of a bumper. The nut 22 is adjusted on the threaded portion 19 to facilitate such movement. Supporting collar 21 provides a thrust plate against which the nut is positioned to guide and hold the hooks in a transversely extending position substantially normal to the plate. The lower extremity of the plate carries a plurality of pins 30 having heads 34 and threaded shanks 32 which are threaded through tapped apertures in the plate. A cotter-key 35 positioned in the extremity in each of the pins prevents them from being removed accidentally from the plate. The pins are adjusted by screwing the same through the plate such that the heads extend beyond the surface of the plate a desired length to engage the surface of the bumper, which may be curved or straight such that the plate may be aligned in a substantially vertical position relative to the bumper. The upper surface of the plate has a notch 40 therein in which the wheel support structures 20 of the wheel balance sensor is mounted.

The support structure 20 of the wheel balance sensor is basically comprised of an elongated support member or shaft 41 having a hook portion 42 formed of a pair of plates attached to the shaft through suitable means such as welding 44. The plates 42 having notched portions 46 therein which are adapted to fit into the notched portion 40 and over the plate to mount the same thereon. An adjusting screw is mounted on the hook portion by means of a threaded flange 48 which is suitably attached between the plates 42 through means (not shown). Flange 48 mounts a bolt 50 which bolt extends substantially parallel to the extent of the shaft and is adapted to engage the surface of the plate 10 so that it may be threaded toward or away from the plate to adjust the position of the shaft 41 relative to the plate 10, as will be hereinafter noted. Also included on the hook portion in a level 55 which is mounted between the plates through a suitable adhesive or putty 60. The level is of the bubble type and is aligned with the surface of the shaft 41 so that it can detect variations of the shaft 41 from the horizontal position. As will be hereinafter noted in the assembly of the wheel balance sensor, the shaft will be maintained in a horizontal position such that the wheel mounted thereon will be in a substantially vertical plane for accurate balance measurements.

The opposite extremity of the elongated support member or shaft 41 mounts a hub indicated generally at 62. The hub is supported on the shaft by means of a pair of spaced bearings 63, 64 which bearings are mounted on recess portions of the shaft such as is indicated at 65, 66 to provide an adequate spacing therebetween such that the cylindrical hub 62 will be accurately mounted concentric with the shaft 41 and be free to rotate thereon. The bearing retainers or dust covers on the bearings are removed "except for the one side that is exposed" to reduce frictions and very light weight oil is used in the bearings, instead of grease, to eliminate drag.

Suitable locking washers 68 bearing against the inner races of the bearings on the reduced portions 65, 66 of the shaft retain the bearings in the spaced relationship. The hub is also secured on the bearings by means of a spring type lock washer or clip 70 which fits into a recess 72 in the hub. Only the dust cover indicated at 74 for the outer and larger bearing races is retained such that the spaced bearings within the cylindrical hub will be substantially sealed in a dust proof type covering to eliminate an entrance of dirt into the bearings so that frictions are not induced into the bearings. Hub 62 has a circular plate 80 attached thereto through means such as screws 83 which thread through tapped apertures in a flange portion 84 of the hub. Also included as part of the hub is a stub shaft 85 having a threaded extremity 86 thereon. The hub and the stub shaft are aligned and concentric. The circular plate 80 is attached to the hub 62 such that the flat surface of the circular plate is normal to the shaft.

Also carried by the cylindrical hub 62 is a cylindrical flange member 90 which is of the same diametrical dimension as the plate 80 and is attached thereto by screws 92 threaded through apertures in the cylindrical member 90 and into tapped apertures 94 in the plate 80. The cylindrical member 90 defines a recess 95 in the hub with the cylindrical member serving to form a support flange for the back surface of the vehicle wheel shown in part at 108, which is adapted to be mounted on the hub for balancing purposes. The wheel when mounted on the hub is held in position and centered with respect to the axis of rotation of the hub by means of a conically shaped thrust member or cone 100 having a smooth aperture 102 therethrough which is slightly larger than the diametrical dimension of the shaft 85 so as to fit relatively snugly thereon and be concentric therewith while permitting relative ease in sliding the cone or thrust member on the shaft. The outer surface of the conical shaped thrust member, that is the tapered surface, is also smoothly and accurately machined since it must bear against the inner edge of the wheel at the opening therein, such as is indicated at 104. A nut 105 is threaded onto the shaft 85 on the threaded portion 86 thereon and will advance the thrust member into the recess 95 defined by the cylindrical flange 90 to urge the surface of the wheel 108 against the edge of the cylindrical member 90 to clamp the same thereon in a centered position.

From a practical standpoint I have found that the cone or thrust member should be approrimately ⅛ inch higher in dimension than the height of the cylinder or cylindrical member 90, and a one and one-half inch dimension in this direction for the cone or thrust member has been found most suitable. Further, the taper on the cone should be approximately 110° from the base with the maximum diametrical dimensions for varying sized wheels extending from 2¼ inches to approximately 4⅜ inches. Two such cones with these maximum and minimum diametrical dimensions (2¼ inches to 3⅜ inches and 3¹⁵⁄₁₆ inches to 4⅜ inches) have been found suitable for most vehicle wheel applications.

In FIGURE 5, I have shown the portable wheel balance sensor in an end view with a vehicle wheel mounted thereon. The inner web of the wheel is connected to the hub 62 through the cooperation of the cone 100 and cylindrical member 90 attached to the hub 62 such that it will be clamped therebetween. In the centered position, the outer periphery of the wheel when the balance sensor is mounted on the bumper of the vehicle will clear the ground and permit rotation of the same.

The base or plate and the support portion of the wheel balance sensor are two separate units so that the base plate 10 can be attached separately to the bumper of the car simply by placing the hooks 14 over the top of the bumper and then adjusting one or more of the pins 30 against the flat or curved surface of the bumper to place the plate in a substantially vertical position. The support portion 20 is then mounted on the wheel of the vehicle to be balanced and the support portion with the wheel mounted thereon is lifted up and placed on the plate 10 by mounting the hook portion 42 in the notch 40 of the plate. Adjustment of the bolt 59 will position the shaft in a substantially horizontal position and the level 55 mounted on the shaft will insure that with this relationship, the wheel will be in a substantially vetrical plane. With the wheel in the vertical position it can be then rotated freely and any off balance portion on the wheel can be located.

In the mounting of the wheel on the support portion 20, the nut 105 and the cone 100 are first removed from the stub shaft 85. The wheel is next mounted or positioned adjacent the hub such that the web or inner portion of the wheel 108 contacts the cylindrical member or flange 90. The back side of the wheel is positioned adjacent this portion of the hub such that the cone as it engages the central aperture of the wheel 108 will contact the front edge thereof. The centering cone 100 is then placed on the stub shaft or centering bolt 85 with the small end of the taper directed toward the recess 95 in the flange 90 of the hub. The nut 105 is then threaded on the threaded portion 86 of the stub shaft to move the cone against the inner edge of the wheel to center the same. The cone must fit the center hole of the wheel so that it can be tightened up against the wheel to center it properly. The nut is tightened through hand pressure and the cone will center the balancer in the center hole in the wheel, so that wheel will be concentric with the shaft 41 and the cylindrical hub 62 and the stub shaft 85. From a practical standpoint, I have found that it is best to mount the wheel balancer onto the wheel while the wheel has its weight on the ground or floor, instead of mounting the wheel with all its weight on the wheel balancer. This eliminates friction between the various parts of the balancer and results in a very accurate centering of the wheel. After the balancer is centered in the wheel, the nut can be tightened to secure the wheel on the support member. The entire assembly is then mounted on the plate 10 and the level of the balancer is adjusted by moving the bolt 50 against the surface of the plate 10 to level the shaft 41 in a horizontal position which will take place the plane of the wheel in a vertical plane. If the wheel is out of balance, it will start rotating and the heavy unbalanced side will come to rest at the bottom under the influence of gravity.

In the normal balancing procedure, if there are weights on the wheel, these are normally removed and the wheel is balanced free of any external weight. In the balancing operation, the wheel is marked if it is unbalanced, such as is indicated at 120 in FIGURE 5, with a mark at the upside of the same indicating the location at which the weight is to be added diametrically opposite the heavy side of the wheel. Wheel weights are attached to the rim in a conventional manner on the topside of the wheel directly in line with the mark, such as indicated at 130. Normally a small sized weight is used and the wheel is then rotated 90 degrees off from this original or unbalanced location to determine whether the wheel will rotate back to its original position or will rotate to a new position indicating that the weight added has been too much. Thus, if the wheel starts to rotate and the weight goes down to the bottom, the weight added has been too heavy. If the wheel starts to rotate and the weight goes to the top, the weight added is too light and more weight must be added. Different sized weights should be added until the wheel will remain stationary or non-rotating for all positions of the wheel. Thus, the wheel will be turned to varying locations with respect to the original position and when released the wheel should remain stationary if the wheel is balanced. When the correct amount of weight has been determined to counter-balance the unbalance of the wheel, this weight is divided and attached to the inside and outside of the wheel with normally a slightly larger portion of the weight being added to the outside of the wheel. Conventional weight sizes may be purchased for this procedure. With the weight properly added in this manner, side slap and vibration at high speed will be eliminated and the wheel will be dynamically balanced also.

With this improved portable wheel balancer, the average home mechanic will have the means readily available for maintaining balance in his wheels to eliminate unnecessary wear in his vehicle tires and also increase the safety and comfort in the operation of his vehicle. The improved portable wheel balance sensor is compact and small in size so that it may be readily stored in the vehicle and be mounted on the bumper of the vehicle for the balancing operation. Varying sized cones may be utilized to support different wheel sizes such that the portable wheel balancer is adapted for all sized vehicles.

In considering this invention it should be remembered that the present disclosure is intended to be illustrative only and variations may be made in the type of attaching and adjusting pins, the materials and the shape of the parts without departing from the scope of the invention. Therefore, I wish to be limited only by the appended claims.

What is claimed is:

1. A portable wheel balance sensor comprising, a flat plate having a pair of transversely extending hooks shaped to fit around the upper edge of a vehicle bumper with the plate extending along the exposed face of the bumper, adjustable screw means positioned along the extent of the plate being adjustable to engage the exposed face of the bumper to position the plate in a substantially vertical position, a shaft having hook means at one extremity shaped to fit over the upper edge of the flat plate, adjustable pin means positioned in the hook means adapted to adjust the angle of the shaft relative to the plate for positioning the shaft horizontally, hub means mounted on the other extremity of the shaft, spaced bearing means mounting and journaling the hub means on the shaft, a threaded stub shaft means secured to the hub means remote from the bearing means and aligned with the center of the bearing means and the shaft on which the hub means is mounted, a cylindrical flange mounted on the hub means and having a diametrical dimension substantially larger than the hub means to provide a thrust surface for a wheel adapted to be mounted on the hub means, a centering and tightening cone having an internal concentric bore that fits snugly over the threaded extremity in the stub shaft, and a nut positioned behind the cone to urge the cone toward the hub means to secure a wheel on the hub means.

2. A portable wheel balance sensor comprising a flat plate having a pair of transversely extending hooks shaped to fit around the upper edge of a vehicle bumper with the plate extending along the exposed face of the bumper, adjustable screw means positioned along the extent of the plate being adjustable to engage the exposed face of the bumper to position the plate in a substantially vertical position, a shaft having hook means at one extremity shaped to fit over the upper edge of the plate, adjustable pin means positioned in the hook means and adapted to adjust the angle of the shaft relative to the plate for positioning the shaft horizontally, hub means mounted on the other end of the shaft, bearing means mounting and journaling the hub means on the shaft, a threaded stub shaft means secured to the hub means at the free extremity thereof and aligned with the center of the bearing means and the shaft on which the hub means is mounted, a centering and tightening cone having an internal concentric bore that fits snugly over the threaded extremity in the stub shaft, and a nut positioned on the stub shaft to urge the cone toward the hub, the dimensions of the cylindrical flange and the diameter and slope of the centering cone being such that it is adapted to engage a vehicle wheel at one surface and at the center thereof to concentrically position the wheel on the hub means and secure the same so that the wheel may be rotated and unbalance on the same detected when the heavy portion of a wheel comes to rest under the influence of gravity in the lowermost position with respect to the hub means.

3. The portable wheel balance sensor of claim 2 and including level means mounted on the shaft to detect the position of the shaft on the plate relative to horizontal direction.

4. A portable wheel balance sensor comprising, plate means having hook means extending transversely from one extremity shaped to be connected to the bumper of a vehicle, means included in the plate means for positioning the plate means in a substantially vertical position on the bumper, a shaft having a slotted flange shaped to fit over and mount the shaft on the plate means at the extremity having the hook means thereon to extend transversely therefrom in a direction opposite to that of the hook means, a cylindrical hub means, bearing means mounted on the free end of the shaft and rotatively mounting the cylindrical hub means, and means including a conically shaped thrust member adapted to mount a wheel to be balanced on the cylindrical hub means for sensing balance of the same upon rotation of the wheel.

5. The portable wheel balance sensor of claim 4 in which the bearing means are a pair of spaced bearings with the retainers being removed to reduce friction and mounted in the cylindrical hub.

6. A portable wheel balance sensor comprising, plate means having hook means extending transversely from one extremity shaped to be connected to the bumper of a vehicle, means included in the plate means for positioning the plate means in a substantially vertical position on the bumper, a cantilever support member having a slotted flange means shaped to fit over and mount on the plate means at the extremity having the hook means thereon to extend transversely therefrom in a direction opposite to that of the hook means, a cylindrical hub means, spaced bearing means mounted on the free end of the cantilever support member and rotatively mounting the cylindrical hub means thereon, and means including a conically shaped thrust member adapted to mount a wheel to be balanced on the cylindrical hub means for sensing balance of the same upon rotation of the wheel on the support member.

7. A portable wheel balance sensor comprising, plate means having adjustable hook means extending transversely from one extremity and shaped to be connected to the bumper of any vehicle, screw type adjustment pins included in the plate means and extending transversely therethrough adapted to engage the bumper of the vehicle to support with the hook means the plate means in a substantially vertical position on the bumper, an elongated cantilever support member having slotted flange means shaped to fit over and mount on the plate means at the extremity having the hook means thereon extend transversely therefrom in a direction opposite to that of the hook means, a cylindrical hub means having a radially extending flange portion, bearing means mounted on the free end of the elongated cantilever support member and positioned within the cylindrical hub means to rotatively mount the cylindrical hub means thereon, and means including a threaded stub shaft on the cylindrical hub means and a conically shaped thrust member adapted to be slidably positioned on the threaded stub shaft for positioning and centering the wheel of a vehicle on the cylindrical hub means such that the balance of the wheel may be sensed upon rotation of the wheel.

8. The portable wheel balance sensor of claim 7 in which the cylindrical hub means with the radially extending flange portion has a recessed area surrounding the stub shaft in which the thrust member is positioned to clamp the wheel to the hub means concentric with the stub shaft.

9. The portable wheel balance sensor of claim 8 in which the conically shaped thrust member is releasably secured on the stub shaft through the threaded connection on the stub shaft and a nut means threaded thereon with the conical sides of the thrust member centering and securing the wheel on the hub means.

References Cited
UNITED STATES PATENTS

| | | | |
|---|---|---|---|
| 2,194,936 | 3/1940 | Hatch | 73—480 XR |
| 3,280,637 | 10/1966 | Ealey et al. | 73—480 XR |

JAMES J. GILL, *Primary Examiner.*